US011204673B2

(12) United States Patent
Gong

(10) Patent No.: US 11,204,673 B2
(45) Date of Patent: *Dec. 21, 2021

(54) TOUCH SUBSTRATE AND DISPLAY DEVICE

(71) Applicants: Chengdu BOE Optoelectronics Technology Co., Ltd., Sichuan (CN); BOE TECHNOLOGY GROUP CO., LTD., Beijing (CN)

(72) Inventor: Qing Gong, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/142,463

(22) Filed: Jan. 6, 2021

(65) Prior Publication Data
US 2021/0124457 A1 Apr. 29, 2021

Related U.S. Application Data

(63) Continuation of application No. 16/329,023, filed as application No. PCT/CN2018/090112 on Jun. 6, 2018, now Pat. No. 10,915,190.

(30) Foreign Application Priority Data

Aug. 17, 2017 (CN) .......................... 201710707271.4

(51) Int. Cl.
G06F 3/044 (2006.01)
G02F 1/1333 (2006.01)
G06F 3/041 (2006.01)

(52) U.S. Cl.
CPC ........ *G06F 3/0443* (2019.05); *G02F 1/13338* (2013.01); *G06F 3/0412* (2013.01); *G06F 3/0446* (2019.05); *G06F 2203/04111* (2013.01)

(58) Field of Classification Search
USPC ........................................................ 345/173
See application file for complete search history.

(56) References Cited

U.S. PATENT DOCUMENTS

2007/0222766 A1   9/2007  Bolender
2009/0102758 A1*  4/2009  Anzai ................. G09G 3/3677
                                                          345/76

(Continued)

FOREIGN PATENT DOCUMENTS

CN   101719038 A   6/2010
CN   103827786 A   5/2014

(Continued)

OTHER PUBLICATIONS

PCT International Search Report; Application No. PCT/CN2018/090112 and Written Opinion; dated Aug. 31, 2018; Form PCT/ISA/210 and PCT/ISA/237 with English Translation.

(Continued)

Primary Examiner — Chineyere D Wills-Burns
(74) Attorney, Agent, or Firm — Nath, Goldberg & Meyer; Joshua B. Goldberg

(57) ABSTRACT

There are provided a touch substrate and a display device, the touch substrate includes touch elements arranged in rows and columns, each of the touch elements includes first electrode blocks coupled together by a connection part and second electrode blocks coupled together by a bridge part, the bridge part crosses the connection part, and an insulation layer is provided between the connection part and the bridge part, the touch elements include a first touch element close to an arc-shaped edge of the touch substrate and a second touch element far away from the arc-shaped edge of the (Continued)

touch substrate, a cross point of the connection part and the bridge part in the first touch element is far away from the arc-shaped edge, and a cross point of the connection part and the bridge part in the second element is at a center position of the second touch element.

20 Claims, 3 Drawing Sheets

(56)  References Cited

U.S. PATENT DOCUMENTS

| 2015/0009428 | A1 | 1/2015 | Nakayama et al. | |
|---|---|---|---|---|
| 2016/0077645 | A1 | 3/2016 | Chien et al. | |
| 2016/0239131 | A1 | 8/2016 | Kang | |
| 2017/0185224 | A1* | 6/2017 | Nagata | G02F 1/13338 |
| 2017/0307924 | A1* | 10/2017 | Liu | G02F 1/13338 |
| 2018/0074609 | A1* | 3/2018 | Jeon | G06F 3/041 |
| 2018/0120988 | A1* | 5/2018 | Kim | G06F 3/0412 |
| 2018/0348906 | A1* | 12/2018 | Hwang | G06F 3/0445 |
| 2018/0348929 | A1* | 12/2018 | Rhe | G06F 3/047 |

FOREIGN PATENT DOCUMENTS

| CN | 104317469 A | 1/2015 |
|---|---|---|
| CN | 204155245 U | 2/2015 |
| CN | 204360355 U | 5/2015 |
| CN | 107390963 A | 11/2017 |
| CN | 108008850 A | 5/2018 |
| EP | 3316089 A1 | 5/2018 |

OTHER PUBLICATIONS

First Office Action of CN; Application No. 201710707271.4; dated Mar. 21, 2019; English Translation Attached.

Supplementary search report dated Apr. 28, 2021 issued in corresponding European Application No. 18845503.4.

* cited by examiner

TOUCH SUBSTRATE AND DISPLAY DEVICE

CROSS-REFERENCE TO RELATED APPLICATIONS

This is a Continuation of U.S. patent application Ser. No. 16/329,023, filed Feb. 27, 2019, a National Phase Application filed under 35 U.S.C. 371 as a national stage of PCT/CN2018/090112 filed on Jun. 6, 2018, an application claiming the benefit to Chinese Application No. 201710707271.4, filed on Aug. 17, 2017, the content of each of which is hereby incorporated by reference in its entirety.

TECHNICAL FIELD

The present disclosure relates to the field of display technology, and in particular to a touch substrate and a display device.

BACKGROUND

There is an existing touch substrate having an arc-shaped edge, for example, the touch substrate includes a plurality of first electrodes and a plurality of second electrodes, which are intersected with each other, each of the first electrodes includes a plurality of first electrode blocks, adjacent first electrode blocks are coupled together by a connection part, each of the second electrodes includes a plurality of second electrode blocks, adjacent second electrode blocks are coupled together by a bridge part, each of the first electrodes and each of the second electrodes intersect with each other at the connection part and the bridge part, that is, the bridge part crosses the connection part, and an insulation layer is provided between the connection part and the bridge part. The touch substrate includes a plurality of touch elements, each of the touch elements includes at least one set of the connection part and the bridge part, which are crossed with each other, and the first electrode blocks and the second electrode blocks coupled to the at least one set of the connection part and the bridge part. Generally, the connection part and the bridge part which are crossed with each other are at a center position of the touch element, either the first electrode blocks coupled together by the connection part or the second electrode blocks coupled together by the bridge part in the touch element are configured as a touch driving electrode, and the remaining ones coupled together are configured as a touch sensing electrode.

For example, in a case where at least a portion of edge of the touch substrate is arc-shaped, in the touch element close to the arc-shaped edge, dimensions and shapes of the first electrode block and the second electrode block proximal to the arc-shaped edge are limited by the arc-shaped edge, thus areas of the first electrode block and the second electrode block proximal to the arc-shaped edge are significantly less than those of the first electrode block and the second electrode block distal from the arc-shaped edge, resulting in that the connection part and the bridge part in the touch element close to the arc-shaped edge are too close to the edge of the touch substrate, thus increasing a short-circuited risk between the connection part and the bridge part of the touch element and wires at the edge of the touch substrate, thereby a lowered yield of the touch substrate is caused.

SUMMARY

An embodiment of the present disclosure provides a touch substrate having an arc-shaped edge, including a plurality of touch elements arranged in rows and columns, each of the touch elements includes first electrode blocks coupled together by a connection part and second electrode blocks coupled together by a bridge part, the bridge part crosses the connection part, and an insulation layer is provided between the connection part and the bridge part, the plurality of touch elements include a first touch element close to the arc-shaped edge of the touch substrate and a second touch element far away from the arc-shaped edge of the touch substrate, a cross point of the connection part and the bridge part in the first touch element is far away from the arc-shaped edge of the touch substrate, and a cross point of the connection part and the bridge part in the second element is at a center position of the second touch element.

In some implementations, in a case where a closest distance from the cross point of the connection part and the bridge part in the first touch element to the arc-shaped edge of the touch substrate is greater than or equal to a predefined threshold value, the cross point of the connection part and the bridge part in the first touch element is far away from the arc-shaped edge of the touch substrate.

In some implementations, the predefined threshold value is a closest distance from the cross point of the connection part and the bridge part in the second touch unit, arranged in a same row and in a same column as the first touch unit, to an edge of the touch substrate.

In some implementations, the plurality of touch elements include a plurality of second touch elements far away from the arc-shaped edge of the touch substrate, cross points of connection parts and bridge parts in the second touch elements arranged in a same row are in a same row, cross points of connection parts and bridge parts in the second touch elements arranged in a same column are in a same column, the cross point of the connection part and the bridge part in the first control element is located at a side of the row of cross points of the connection parts and the bridge parts in the second touch elements arranged in the same row as the first touch element, away from an edge of the touch substrate, and at a side of the column of cross points of the connection parts and the bridge parts in the second touch elements arranged in the same column as the first touch element, away from the edge of the touch substrate.

In some implementations, the cross point of the connection part and the bridge part in the first touch element is at an approximate center position of the first touch element.

In some implementations, a sum of areas of the first electrode blocks is equal to a sum of areas of the second electrode blocks in the first touch element.

In some implementations, the plurality of touch elements include a plurality of first touch elements.

In some implementations, the first electrode blocks, the second electrode blocks and the connection part in each of the touch elements are provided in a same layer and formed of a same material.

In some implementations, the first electrode blocks, the second electrode blocks and the connection part in each of the touch elements are formed of indium tin oxide (ITO).

In some implementations, the first electrode blocks are arranged in a column direction, and the second electrode blocks are arranged in a row direction, in the column direction, the first electrode blocks of adjacent touch elements are formed as an integrative structure, and in the row direction, the second electrode blocks of adjacent touch elements are formed as an integrative structure.

In some implementations, in each of the touch elements, the first electrode blocks coupled together by the connection part are configured as a touch driving electrode, and the second electrode blocks coupled together by the bridge part are configured as a touch sensing electrode.

An embodiment of the present disclosure provides a display device, including the above touch substrate.

DESCRIPTION OF EMBODIMENTS

In order to make a person skilled in the art understand technical solutions of the present disclosure better, the present disclosure will be described in detail below in conjunction with accompanying drawings and specific embodiments.

Figure 1:
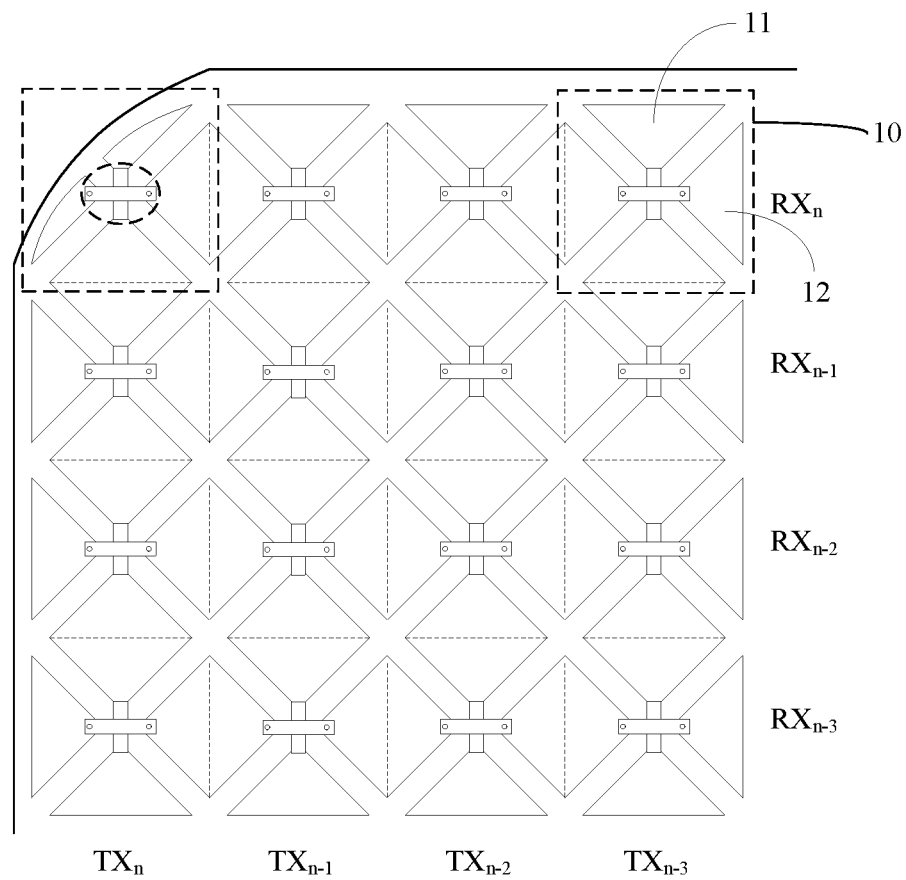
FIG. 1 shows a diagram of a touch substrate having an arc-shaped edge.

FIG. 1 shows a diagram of a touch substrate having an arc-shaped edge. As shown in FIG. 1, the touch substrate includes a plurality of first electrodes ($TX_n$ through $TX_{n-3}$) and a plurality of second electrodes ($RX_n$ through $RX_{n-3}$). As an example, each of the first electrodes extends in a column direction, and the plurality of first electrodes are arranged in a row direction, each of the second electrodes extends in a row direction, and the plurality of second electrodes are arranged in a column direction.

Each of the first electrodes includes a plurality of first electrode blocks, adjacent first electrode blocks are coupled together by a connection part, each of the second electrodes includes a plurality of second electrode blocks, adjacent second electrode blocks are coupled together by a bridge part, each of the first electrodes and each of the second electrodes intersect with each other at the connection part and the bridge part, that is, the bridge part crosses the connection part, and an insulation layer is provided between the connection part and the bridge part.

As shown in FIG. 1, a cross point of the connection part and the bridge part which are crossed with each other is taken as a center position, two ½ first electrode blocks coupled together by a single connection part and two ½ second electrode blocks coupled together by a single bridge part constitute a touch element 10. That is, the touch substrate includes a plurality of touch elements arranged in rows and columns. In each of the touch elements, for example, the two ½ first electrode blocks coupled together by the connection part are configured as a touch driving electrode 11, and the two ½ second electrode blocks coupled together by the bridge part are configured as a touch sensing electrode 12.

It should be understood that, in each of the touch elements, for example, the two ½ first electrode blocks coupled together by the connection part may be configured as a touch sensing electrode, and the two ½ second electrode blocks coupled together by the bridge part may be configured as a touch driving electrode.

In the example shown in FIG. 1, the touch substrate has an arc-shaped edge at a top left corner, thus in the touch element close to the arc-shaped edge, dimensions and shapes of the first electrode block and the second electrode block proximal to the arc-shaped edge are limited by the arc-shaped edge, and areas of the first electrode block and the second electrode block proximal to the arc-shaped edge are significantly less than those of the first electrode block and the second electrode block distal from the arc-shaped edge, resulting in that the connection part and the bridge part in the touch element close to the arc-shaped edge are too close to the edge of the touch substrate, thus increasing a short-circuited risk between the connection part and the bridge part of the touch element and wires at the edge of the touch substrate, thereby a lowered yield of the touch substrate is caused.

Figure 2:
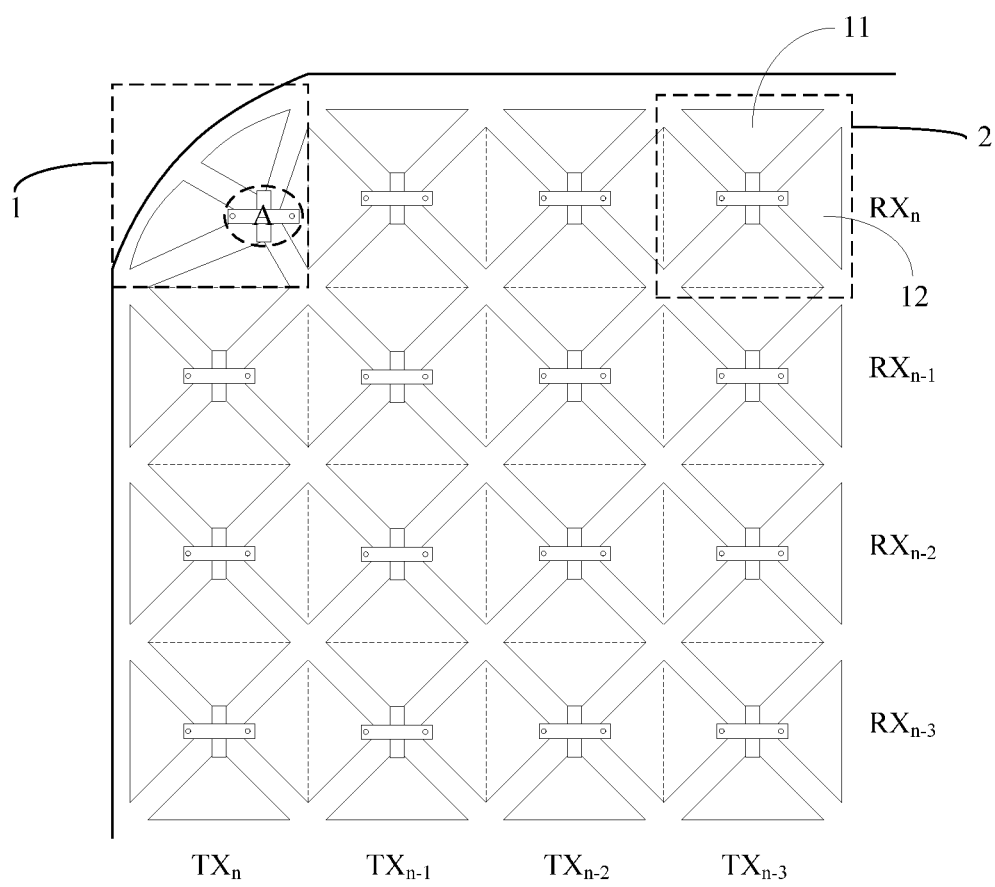
FIG. 2 shows a diagram of a touch substrate having an arc-shaped edge in an embodiment of the present application.
Figure 3:
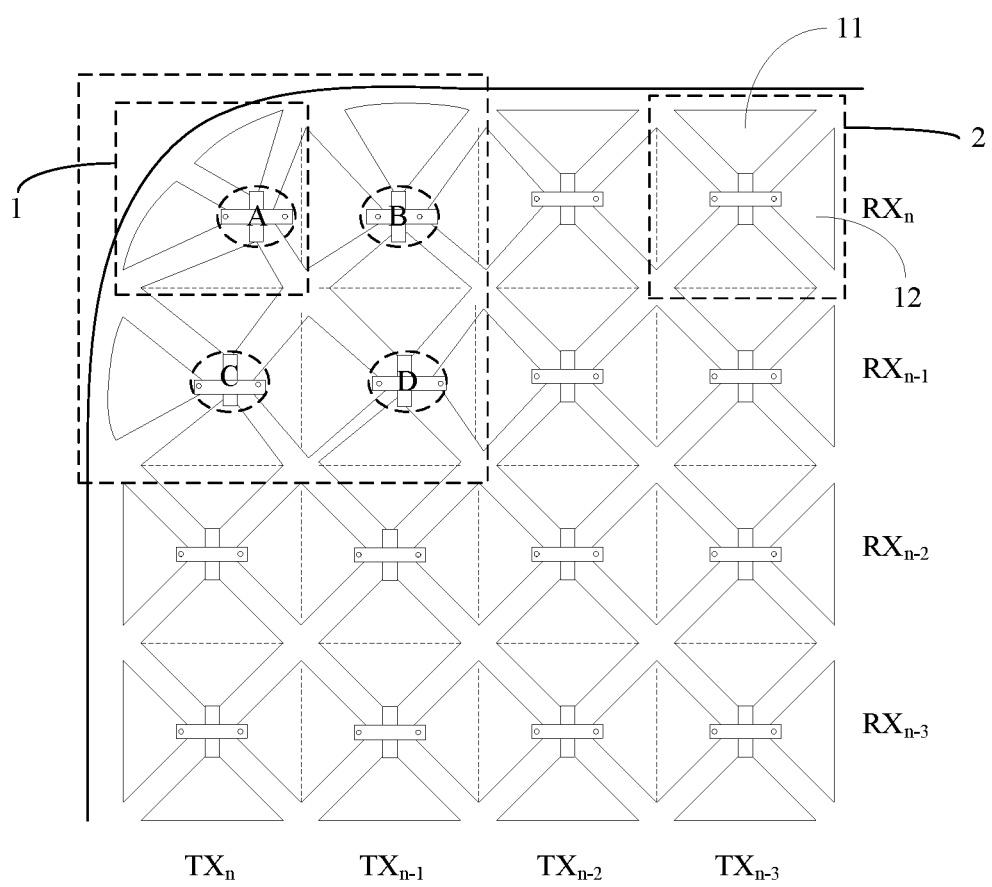
FIG. 3 shows a diagram of a touch substrate having an arc-shaped edge in an embodiment of the present application.

FIGS. 2 and 3 show examples of touch substrates each having an arc-shaped edge according to embodiments of the present application.

As shown in FIGS. 2 and 3, each of the touch substrates includes a plurality of touch elements arranged in rows and columns, each of the touch elements includes first electrode blocks coupled together by a connection part and second electrode blocks coupled together by a bridge part, the bridge part crosses the connection part, and an insulation layer is provided between the connection part and the bridge part. The plurality of touch elements include a first touch element 1 close to an arc-shaped edge of the touch substrate and a second touch element 2 far away from the arc-shaped edge of the touch substrate, a cross point of the connection part and the bridge part in the first touch element 1 is far away from the arc-shaped edge of the touch substrate, and a cross point of the connection part and the bridge part in the second touch element 2 is at a center position (e.g., geometric center position) of the second touch element 2.

In some implementations, by comparing a closest distance from the cross point of the connection part and the bridge part in the first touch element 1 to the edge of the touch substrate with a predefined threshold value, it is judged whether the cross point of the connection part and the bridge part in the first touch element 1 is far away from the edge of the touch substrate.

For example, in a case where the closest distance is greater than or equal to the predefined threshold value, it is judged that the cross point of the connection part and the bridge part in the first touch element 1 is far away from the edge of the touch substrate.

For example, the predefined threshold value may be a closest distance from the cross point of the connection part and the bridge part in the second touch unit 2, arranged in a same row and in a same column as the first touch unit 1, to the edge of the touch substrate.

Referring to FIGS. 2 and 3, in the present embodiment, the first touch element 1 close to an arc-shaped edge of the touch substrate includes at least the touch element(s) whose edge includes at least a portion of the arc-shaped edge, and when the arc-shaped edge of the touch substrate relates to a relative large region, the touch element(s) whose edge does not include the arc-shaped edge but is adjacent to the touch element whose edge includes at least a portion of the arc-shaped edge may also be considered as the first touch element 1 close to an arc-shaped edge of the touch substrate.

In some implementations, there are a plurality of second touch elements 2, cross points of connection parts and bridge parts in the second touch elements 2 arranged in a same row are in a same row, cross points of connection parts and bridge parts in the second touch elements 2 arranged in a same column are in a same column, the cross point of the connection part and the bridge part in the first control element 1 is located at a side of the row of cross points of the connection parts and the bridge parts in the second touch elements 2 arranged in the same row as the first touch element 1, away from the edge of the touch substrate, and at a side of the column of cross points of the connection parts and the bridge parts in the second touch elements 2 arranged in the same column as the first touch element 1, away from the edge of the touch substrate.

In some implementations, the cross point of the connection part and the bridge part in the first touch element 1 is at an approximate center position (e.g., approximate geometric center position) of the first touch element 1.

It should be noted that, in the embodiment, for example, the cross point of the connection part and the bridge part in each of the second touch elements 2 is at the center position of each of the second touch elements 2, two ½ first electrode blocks are coupled together by the connection part, and two ½ second electrode blocks are coupled together by the bridge part. The cross point of the connection part and the bridge part in the first touch element 1 may be not at the center position of the first touch element 1, and since the first touch element 1 is close to the arc-shaped edge of the touch substrate and affected by the arc-shaped edge of the touch substrate, dimensions and shapes of the first electrode blocks and the second electrode blocks in the first touch element 1 may be irregular, for example, may be different from dimensions and shapes of the first electrode blocks and the second electrode blocks in the second touch element 2, as long as the cross point of the connection part and the bridge part in the first touch element 1 is far away from the edge of the touch substrate.

In some implementations, dimensions and shapes of the first electrode blocks and the second electrode blocks in the first touch element 1 may be various respectively, and dimensions and shapes of the first electrode blocks and the second electrode blocks in the second touch element 2 may be the same with each other.

In some implementations, a sum of areas of the first electrode blocks in the first touch element 1 may be equal to a sum of areas of the second electrode blocks in the first touch element 1.

In the embodiment, in each of the touch elements, for example, the first electrode blocks coupled together by the connection part are configured as a touch driving electrode 11, and the second electrode blocks coupled together by the bridge part are configured as a touch sensing electrode 12. It should be understood that, alternatively, in each of the touch elements, the first electrode blocks coupled together by the connection part may be configured as a touch sensing electrode, thus the second electrode blocks coupled together by the bridge part are configured as a touch driving electrode.

In some implementations, in the row direction, the second electrode blocks of adjacent touch elements are formed as an integrative structure, and in the column direction, the first electrode blocks of adjacent touch elements are formed as an integrative structure.

In the touch substrate of the embodiment, the connection part and the bridge part in the first touch element 1 close to the arc-shaped edge of the touch substrate are far away from the arc-shaped edge of the touch substrate, that is, are moved towards a center region of the touch substrate, thus a short-circuited risk between the connection part and the bridge part in the first touch element 1 and wires at the edge of the touch substrate is lowered effectively, meanwhile, shapes of first electrode blocks and second electrode blocks in the first touch element 1 are changed so that the sum of areas of the first electrode blocks in the first touch element 1 and the sum of areas of the second electrode blocks in the first touch element 1 are more balanced, thereby touch sensitivity of the touch substrate close to the arc-shaped edge is ensured.

The touch substrate shown in FIG. 2 includes only one first touch element 1. As shown in FIG. 2, the first touch element 1 is close to the arc-shaped edge of the touch substrate, the cross point of the connection part and the bridge part in the first touch element 1 is at a position A, it can be seen that, the position A is closer to the center position of the touch substrate than the cross point of the connection part and the bridge part in the second touch element 2 arranged in the same column or row as the first touch element 1, avoiding the connection part and the bridge part at the position A being too close to the edge of the touch substrate, thus a short-circuited risk between the connection part and the bridge part of the touch element and wires at the edge of the touch substrate is lowered effectively. Meanwhile, comparing with the second touch element 2, the shape of the first touch element 1 is changed and the first electrode blocks and the second electrode blocks in the first touch element 1 are also changed so that the sum of areas of the first electrode blocks in the first touch element 1 and the sum of areas of the second electrode blocks in the first touch element 1 are more balanced, thereby touch sensitivity of the touch substrate close to the arc-shaped edge is ensured.

It should be understood that, shapes and areas of the first electrode blocks and the second electrode blocks in the first touch element 1 may be set by persons skilled in the art as required, as long as they accord with the concept of technical solutions of the present disclosure.

The touch substrate shown in FIG. 3 includes four first touch elements 1. As shown in FIG. 3, when the arc-shaped edge of the touch substrate relates to a relative large region, a plurality of first touch elements 1 are required to be formed close to the arc-shaped edge, the connection part and the bridge part of each of the first touch elements 1 are moved towards the center position of the touch substrate.

As shown in FIG. 3, cross points of connection parts and bridge parts of the four first touch elements 1 are respectively at positions A, B, C and D, it can be seen that, the connection part and the bridge part at each of the positions A, B, C and D are closer to the center position of the touch substrate than the cross point of the connection part and the bridge part in the second touch element 1 arranged in the same column or row as the corresponding first touch element 1, avoiding the connection part and the bridge part at each of the positions A, B, C and D being too close to the edge of the touch substrate, thus a short-circuited risk between the connection part and the bridge part at each of the positions A, B, C and D and wires at the edge of the touch substrate is lowered effectively. Meanwhile, with respect to the second touch element 2, the shape of the first touch element 1 is changed and the first electrode blocks and the second electrode blocks in the first touch element 1 are also changed so that the sum of areas of the first electrode blocks in the first touch element 1 and the sum of areas of the second electrode blocks in the first touch element 1 are more balanced, thereby touch sensitivity of the touch substrate close to the arc-shaped edge is ensured.

It should be understood that, shapes and areas of the first electrode blocks and the second electrode blocks in each of the first touch elements 1 may be set by persons skilled in the art as required, as long as they accord with the concept of technical solutions of the present disclosure.

It should be noted that, shapes and dimensions of the four first touch elements 1 shown in FIG. 3 may be various respectively, and distances from the positions A, B, C and D to edges of the corresponding first touch elements 1, where the positions A, B, C and D are located, close to the arc-shaped edge of the touch substrate may be various respectively.

For example, the closest distance from the position A to the edge of the first touch element 1 (i.e., the arc-shaped edge of the touch substrate), where the position A is located, close to the arc-shaped edge of the touch substrate may be greater than or equal to a first predefined threshold value, the closest distance from the position B to the edge of the first touch element 1 (i.e., the arc-shaped edge of the touch substrate), where the position B is located, close to the arc-shaped edge of the touch substrate may be greater than or equal to a second predefined threshold value, the closest distance from the position C to the edge of the first touch element 1 (i.e., the arc-shaped edge of the touch substrate), where the position C is located, close to the arc-shaped edge of the touch substrate may be greater than or equal to a third predefined threshold value, and the closest distance from the position D to the edge of the first touch element 1 (i.e., the arc-shaped edge of the touch substrate), where the position D is located, close to the arc-shaped edge of the touch substrate may be greater than or equal to a fourth predefined threshold value.

For example, the first predefined threshold value may be a closest distance from the cross point of the connection part and the bridge part in the second touch unit 2, arranged in a same row and in a same column as the first touch unit 1 where the position A is located, to the edge of the touch substrate, the second predefined threshold value may be a closest distance from the cross point of the connection part and the bridge part in the second touch unit 2, arranged in a same row and in a same column as the first touch unit 1 where the position B is located, to the edge of the touch substrate, the third predefined threshold value may be a closest distance from the cross point of the connection part and the bridge part in the second touch unit 2, arranged in a same row and in a same column as the first touch unit 1 where the position C is located, to the edge of the touch substrate, and the fourth predefined threshold value may be a closest distance from the cross point of the connection part and the bridge part in the second touch unit 2, arranged in a same row and in a same column as the first touch unit 1 where the position D is located, to the edge of the touch substrate.

In some implementations, the first electrode blocks, the second electrode blocks and the connection parts in the touch elements (including the first touch element 1 and the second touch element 2) of the embodiment are provided in a same layer and formed of a same material, and in such case, these structures may be formed by a single patterning process.

In some implementations, the first electrode blocks, the second electrode blocks and the connection parts of the embodiment all may be formed of indium tin oxide (ITO), certainly, technical solutions of the present disclosure are not limited thereto, the first electrode blocks, the second electrode blocks and the connection parts of the embodiment may also be formed of other materials.

Similarly, the bridge part of the embodiment may be formed of conductive material such as metal, and the present disclosure is not limited thereto.

It should be understood that, the embodiment of the present disclosure is described above by taking the touch substrate having only one arc-shaped edge as an example, however, the present disclosure is not limited thereto, and in practical applications, the touch substrate may include a plurality of arc-shaped edges separated from each other, and each of the arc-shaped edges may result in generation of one or more first touch elements 1, which will not be detailed repeatedly herein.

An embodiment of the present disclosure further provides a display device including the touch substrate described above. The display device may be any product or member having display function, such as a mobile phone, a tablet computer, a television, a display, a notebook computer, a digital photo frame, and a navigator.

Certainly, the display device of the embodiment may further include other conventional structures, such as a power supply element, a display driving element and so on.

It should be understood that, the above embodiments are merely exemplary embodiments for explaining principle of the present disclosure, but the present disclosure is not limited thereto. Various modifications and improvements may be made by those ordinary skilled in the art within the spirit and essence of the present disclosure, these modifications and improvements fall into the protection scope of the present disclosure.

The invention claimed is:

1. A touch substrate having an arc-shaped edge, comprising: a plurality of touch elements arranged in rows and columns, each of the touch elements comprises first electrode blocks coupled together by a connection part and second electrode blocks coupled together by a bridge part, the plurality of touch elements comprise multiple first touch elements close to the arc-shaped edge of the touch substrate and multiple second touch elements far away from the arc-shaped edge of the touch substrate, wherein the first touch elements comprise at least the touch element whose edge comprises at least a portion of the arc-shaped edge, and each of the first touch elements is directly adjacent to at least another one of the first touch elements in a row or column direction, connection parts in the second touch elements arranged in a same row are in a same row, connection parts in the second touch elements arranged in a same column are in a same column, the connection part in each of the first touch elements is located at a side of the row of the connection parts in the second touch elements arranged in the same row as said each of the first touch elements, away from an edge of the touch substrate, and at a side of the column of the connection parts in the second touch elements arranged in the same column as said each of the first touch elements, away from the edge of the touch substrate, and the first touch elements comprises at least one first first touch element and at least one second first touch element, the first first touch element is at a side of the second first touch element away from the second touch element in a row direction or in a column direction, and a distance from the connection part in the first first touch element, to the row of the connection parts in the second touch elements arranged in the same row as the first first touch element, or to the column of the connection parts in the second touch elements arranged in the same column as the first first touch element, is greater than a distance from the connection part in the second first touch element, to the row of the connection parts in the second touch elements arranged in the same row as the second first touch element, or to the column of the connection parts in the second touch elements arranged in the same column as the second first touch element.

2. The touch substrate of claim 1, wherein bridge parts in the second touch elements arranged in a same row are in a same row, bridge parts in the second touch elements arranged in a same column are in a same column, the bridge part in each of the first touch elements is located at a side of the row of the bridge parts in the second touch elements arranged in the same row as said each of the first touch elements, away from the edge of the touch substrate, and at a side of the column of the bridge parts in the second touch elements arranged in the same column as said each of the first touch elements, away from the edge of the touch substrate, and
- a distance from the bridge part in the first first touch element, to the row of the bridge parts in the second touch elements arranged in the same row as the first first touch element, or to the column of the bridge parts in the second touch elements arranged in the same column as the first first touch element, is greater than a distance from the bridge part in the second first touch element, to the row of the bridge parts in the second touch elements arranged in the same row as the second first touch element, or to the column of the bridge parts in the second touch elements arranged in the same column as the second first touch element.

3. The touch substrate of claim 2, wherein the bridge part crosses the connection part, and an insulation layer is provided between the connection part and the bridge part, cross points of the connection parts and the bridge parts in the second touch elements arranged in a same row are in a same row, cross points of the connection parts and the bridge parts in the second touch elements arranged in a same column are in a same column, a cross point of the connection part and the bridge part in each of the first touch elements is located at a side of the row of cross points of the connection parts and the bridge parts in the second touch elements arranged in the same row as said each of the first touch elements, away from the edge of the touch substrate, and at a side of the column of cross points of the connection parts and the bridge parts in the second touch elements arranged in the same column as said each of the first touch elements, away from the edge of the touch substrate, and a cross point of the connection part and the bridge part in each of the second touch elements is at a center position of said each of the second touch elements.

4. The touch substrate of claim 1, wherein the bridge part crosses the connection part, and an insulation layer is provided between the connection part and the bridge part, a connection line of cross points of connection parts and bridge parts in adjacent ones of the first touch elements in a same row is not parallel to a connection line of cross points of connection parts and bridge parts in the second touch elements arranged in the same row as said adjacent ones of the first touch elements, and a connection line of cross points of connection parts and bridge parts in adjacent ones of the first touch elements in a same column is not parallel to a connection line of cross points of connection parts and bridge parts in the second touch elements arranged in the same column as said adjacent ones of the first touch elements.

5. The touch substrate of claim 1, wherein the bridge part crosses the connection part, and an insulation layer is provided between the connection part and the bridge part, and a closest distance from a cross point of the connection part and the bridge part in said each of the first touch elements to the arc-shaped edge of the touch substrate is greater than or equal to a closest distance from a cross point of the connection part and the bridge part in the second touch element, arranged in a same row or column as said each of the first touch elements, to the edge of the touch substrate.

6. The touch substrate of claim 1, wherein the bridge part crosses the connection part, and an insulation layer is provided between the connection part and the bridge part, and a cross point of the connection part and the bridge part in said each of the first touch elements is at an approximate center position of said each of the first touch elements.

7. The touch substrate of claim 1, wherein in said each of the first touch elements, a sum of areas of the first electrode blocks is equal to a sum of areas of the second electrode blocks.

8. The touch substrate of claim 1, wherein the first electrode blocks, the second electrode blocks and the connection part in each of the touch elements are provided in a same layer and formed of a same material.

9. The touch substrate of claim 1, wherein the first electrode blocks are arranged in a column direction, and the second electrode blocks are arranged in a row direction, in the column direction, the first electrode blocks of adjacent touch elements are formed as an integrative structure, and in the row direction, the second electrode blocks of adjacent touch elements are formed as an integrative structure.

10. The touch substrate of claim 1, wherein in each of the touch elements, the first electrode blocks coupled together by the connection part are configured as a touch driving electrode, and the second electrode blocks coupled together by the bridge part are configured as a touch sensing electrode.

11. A display device, comprising a touch substrate, the touch substrate having an arc-shaped edge and comprising a plurality of touch elements arranged in rows and columns, each of the touch elements comprises first electrode blocks coupled together by a connection part and second electrode blocks coupled together by a bridge part, the plurality of touch elements comprise multiple first touch elements close to the arc-shaped edge of the touch substrate and multiple second touch elements far away from the arc-shaped edge of the touch substrate,
- wherein the first touch elements comprise at least the touch element whose edge comprises at least a portion of the arc-shaped edge, and each of the first touch elements is directly adjacent to at least another one of the first touch elements in a row or column direction,
- connection parts in the second touch elements arranged in a same row are in a same row, connection parts in the second touch elements arranged in a same column are in a same column, the connection part in each of the first touch elements is located at a side of the row of the connection parts in the second touch elements arranged in the same row as said each of the first touch elements, away from an edge of the touch substrate, and at a side of the column of the connection parts in the second touch elements arranged in the same column as said each of the first touch elements, away from the edge of the touch substrate, and
- the first touch elements comprises at least one first first touch element and at least one second first touch element, the first first touch element is at a side of the second first touch element away from the second touch element in a row direction or in a column direction, and a distance from the connection part in the first first touch element, to the row of the connection parts in the second touch elements arranged in the same row as the first first touch element, or to the column of the connection parts in the second touch elements arranged in the same column as the first first touch element, is greater than a distance from the connection part in the second first touch element, to the row of the connection parts in the second touch elements arranged in the same row as the second first touch element, or to the column of the connection parts in the second touch elements arranged in the same column as the second first touch element.

12. The display device of claim 11, wherein bridge parts in the second touch elements arranged in a same row are in a same row, bridge parts in the second touch elements arranged in a same column are in a same column, the bridge part in each of the first touch elements is located at a side of the row of the bridge parts in the second touch elements arranged in the same row as said each of the first touch elements, away from the edge of the touch substrate, and at a side of the column of the bridge parts in the second touch elements arranged in the same column as said each of the first touch elements, away from the edge of the touch substrate, and a distance from the bridge part in the first first touch element, to the row of the bridge parts in the second touch elements arranged in the same row as the first first touch element, or to the column of the bridge parts in the second touch elements arranged in the same column as the first first touch element, is greater than a distance from the bridge part in the second first touch element, to the row of the bridge parts in the second touch elements arranged in the same row as the second first touch element, or to the column of the bridge parts in the second touch elements arranged in the same column as the second first touch element.

13. The display device of claim 11, wherein the bridge part crosses the connection part, and an insulation layer is provided between the connection part and the bridge part, cross points of the connection parts and the bridge parts in the second touch elements arranged in a same row are in a same row, cross points of the connection parts and the bridge parts in the second touch elements arranged in a same column are in a same column, a cross point of the connection part and the bridge part in each of the first touch elements is located at a side of the row of cross points of the connection parts and the bridge parts in the second touch elements arranged in the same row as said each of the first touch elements, away from the edge of the touch substrate, and at a side of the column of cross points of the connection parts and the bridge parts in the second touch elements arranged in the same column as said each of the first touch elements, away from the edge of the touch substrate, and a cross point of the connection part and the bridge part in each of the second touch elements is at a center position of said each of the second touch elements.

14. The display device of claim 11, wherein the bridge part crosses the connection part, and an insulation layer is provided between the connection part and the bridge part, a connection line of cross points of connection parts and bridge parts in adjacent ones of the first touch elements in a same row is not parallel to a connection line of cross points of connection parts and bridge parts in the second touch elements arranged in the same row as said adjacent ones of the first touch elements, and a connection line of cross points of connection parts and bridge parts in adjacent ones of the first touch elements in a same column is not parallel to a connection line of cross points of connection parts and bridge parts in the second touch elements arranged in the same column as said adjacent ones of the first touch elements.

15. The display device of claim 11, wherein the bridge part crosses the connection part, and an insulation layer is provided between the connection part and the bridge part, and a closest distance from a cross point of the connection part and the bridge part in said each of the first touch elements to the arc-shaped edge of the touch substrate is greater than or equal to a closest distance from a cross point of the connection part and the bridge part in the second touch unit, arranged in a same row and in a same column as said each of the first touch units, to the edge of the touch substrate.

16. The display device of claim 11, wherein the bridge part crosses the connection part, and an insulation layer is provided between the connection part and the bridge part, and a cross point of the connection part and the bridge part in said each of the first touch elements is at an approximate center position of said each of the first touch elements.

17. The display device of claim 11, wherein in said each of the first touch elements, a sum of areas of the first electrode blocks is equal to a sum of areas of the second electrode blocks.

18. The display device of claim 11, wherein the first electrode blocks, the second electrode blocks and the connection part in each of the touch elements are provided in a same layer and formed of a same material.

19. The display device of claim 11, wherein the first electrode blocks are arranged in a column direction, and the second electrode blocks are arranged in a row direction, in the column direction, the first electrode blocks of adjacent touch elements are formed as an integrative structure, and in the row direction, the second electrode blocks of adjacent touch elements are formed as an integrative structure.

20. The display device of claim 11, wherein in each of the touch elements, the first electrode blocks coupled together by the connection part are configured as a touch driving electrode, and the second electrode blocks coupled together by the bridge part are configured as a touch sensing electrode.

* * * * *